June 6, 1933.   J. I. MEADE   1,912,459
DEVICE FOR VULCANIZING FLANGES ON TANK CAR MANHOLES
Filed Sept. 23, 1931   2 Sheets-Sheet 1
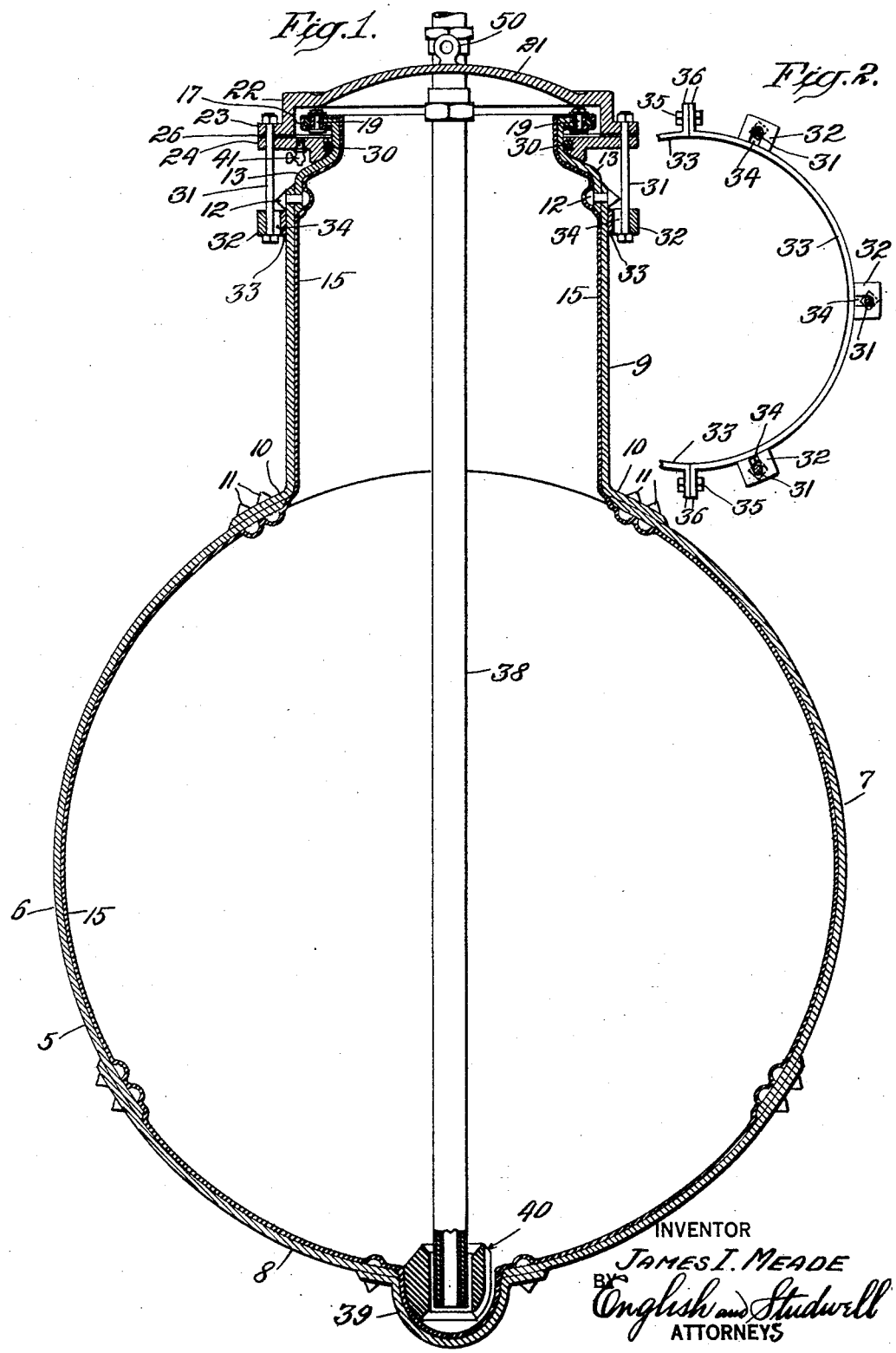
INVENTOR
JAMES I. MEADE
BY English and Studwell
ATTORNEYS June 6, 1933.  J. I. MEADE  1,912,459
DEVICE FOR VULCANIZING FLANGES ON TANK CAR MANHOLES
Filed Sept. 23, 1931  2 Sheets-Sheet 2
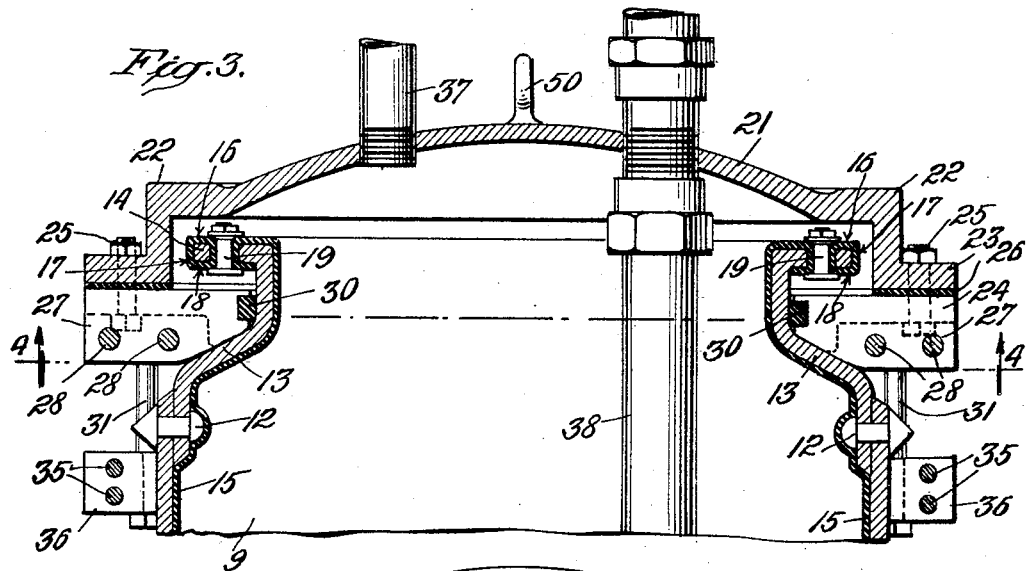
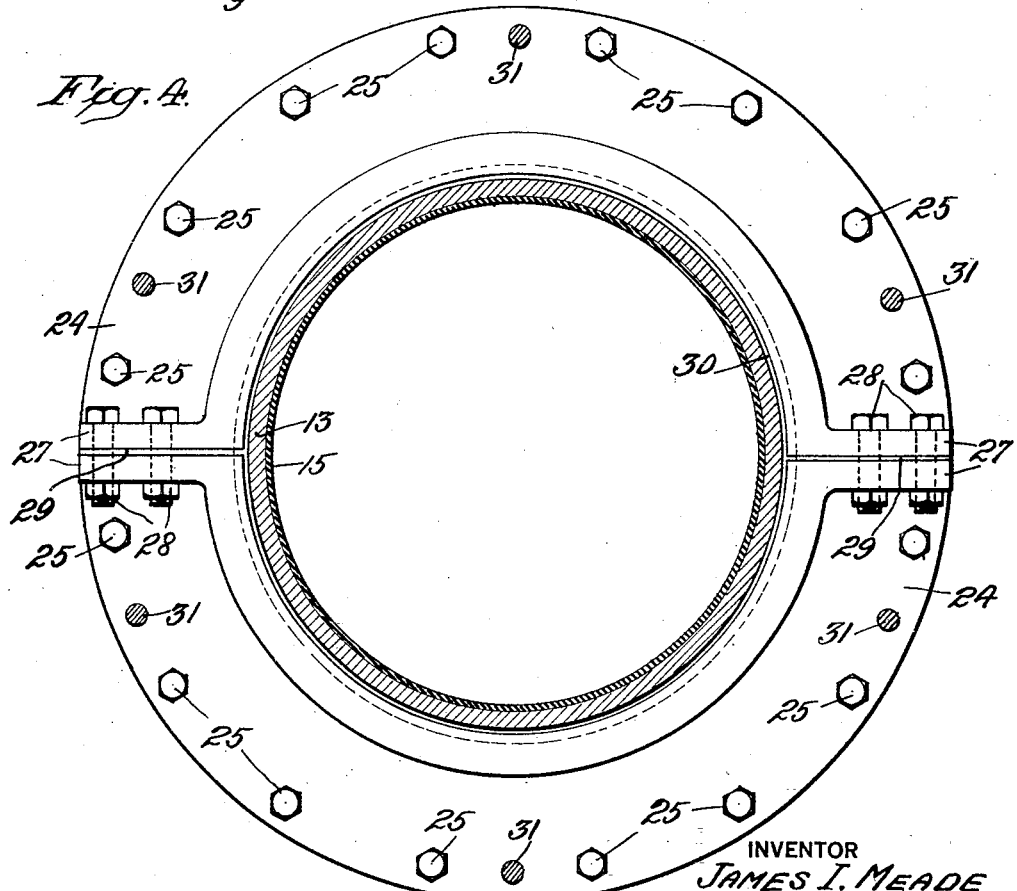
INVENTOR
JAMES I. MEADE
BY English and Studwell
ATTORNEYS

UNITED STATES PATENT OFFICE

JAMES I. MEADE, OF BUTLER, NEW JERSEY, ASSIGNOR TO AMERICAN HARD RUBBER COMPANY, OF NEW YORK, N. Y., A CORPORATION OF NEW YORK

DEVICE FOR VULCANIZING FLANGES ON TANK CAR MANHOLES

Application filed September 23, 1931. Serial No. 564,569.

The invention relates to vulcanization of rubber-lined tank cars used for the shipment of acids, alkalis and other metal-corroding chemicals, and more particularly to an improvement in the vulcanization of the rubber covered flanges of the manholes or domes of such tank cars.

The tanks of railroad tank cars are usually horizontally-arranged, cylindrical metal receptacles provided on their top side with a manhole or dome in the form of an upwardly extending cylindrical structure having on its upper end a laterally-extending annular flange. When such tank cars are used for the transportation of corrosive chemicals, the interior surfaces of the tank and the neck portion of the manhole are covered with vulcanized rubber. Heretofore only the upper horizontal surface of the flange has been covered with vulcanized rubber, the peripheral rim, the under surface, and the bolt holes through the flange being left uncovered because, according to the method of vulcanization employed, the vulcanizing substance, steam, could not reach those parts. The method of vulcanizing rubber-lined tank cars heretofore universally practised, so far as known, has been to clamp a cover on the top of the manhole and introduce steam at the proper temperature and pressure into tank. This method prevents steam from reaching the outer rim or periphery of the flange, as well as the lower surface thereof and the bolt holes piercing it. It is possible, of course, to introduce the whole tank car into a huge vulcanizing chamber, if there were one large enough for the purpose, but such a procedure would be prohibitively expensive. The result has been, that heretofore rubber lined tank cars have been put into use with the manhole or dome flange covered on its upper surface only with vulcanized rubber, the other surfaces of the flange having no rubber covering at all. For a time the trade accepted this situation, but the exposure of the incompletely protected manhole flange to the corrosive action of drippings from the chemicals carried by the tank cars has given rise to a strong demand for rubber-lined tank cars having properly vulcanized rubber-covered manhole flanges. The vulcanizing device of the present invention has been produced to meet that demand and, so fas as applicant is aware, there has been produced for the first time a rubber-lined tank car having a rubber-covered manhole flange. The construction of the device and its mode of operation are fully set forth hereinafter and the structure of the device is particularly pointed out in the appended claims.

In the preferred embodiment of my invention disclosed in the accompanying drawings, Fig. 1 is a vertical sectional view through a tank car-tank of usual construction having applied thereto the improved vulcanizing unit used for the vulcanization of the rubber covering for the manhole flange; Fig. 2 is a plan view of the split ring used for holding the unit down on the manhole; Fig. 3 is a vertical sectional view through the vulcanizing unit and through the upper part of the manhole neck; and Fig. 4 is a sectional view on the line 4—4 of Fig. 3, looking in the direction of the arrows.

The body of the tank, indicated at 5, is made up of several arcuate metal sections 6, 7 and 8, the edges of which are overlapped and riveted to form a cylindrical tank, which may be provided with ends in the conventional manner. At the substantially middle point of the top of the tank there is provided a manhole in the form of an upwardly projecting cylindrical extension 9, the lower end of which is flanged at 10, the flange 10 resting on and being riveted to the tank body at 11. At its upper end the cylindrical extension 9 is riveted at 12 to a contracted neck portion 13, the upper end of which is formed with a laterally extending annular flange 14 that is adapted to receive and hold a tank cover in place.

The inside of the tank is provided with a rubber lining 15 which extends completely over the inner face of the tank and serves to effectively prevent the acid or other corrosive chemical contents of the tank from having access to any metal portion of the tank body, including the rivets which unite the several parts of the tank.

It will be seen by reference to Fig. 3, that the rubber lining 15 not only covers the inside face of the tank walls but that the same extends up through the cylindrical portion 9 and neck 13 thereon. It also extends over the top face of the flange 14, as shown at 16, over the peripheral edge thereof, at 17, and on the under face of the flange as shown at 18. The bolt-holes, in which temporary bolts 19 are shown, are also lined with rubber.

To facilitate the vulcanization of the rubber enclosing the flange 14 and lining the bolt-holes formed therein, I provide a vulcanizing unit or device comprising three main parts, a dome-shaped or cover-like part 21 and a split ring 24, between which the flange 14 is enclosed, and a split clamping ring 33 which serves to hold the cover 21 and ring 24 in place during the vulcanizing process. An eye 50 is provided on the cover to facilitate its placement on the tank and removal therefrom. The cover 21 is provided with a downwardly extending circumferential wall or skirt 22, the lower end of which is formed with a lateral flange 23. The flange 23 is supported upon the upper face of the split ring 24 to which it is secured by bolts 25. A gasket 26 is interposed between the lower face of the flange 23 and the upper face of the split ring 24 to provide a tight joint between these parts and prevent the escape of steam used for the vulcanization of the rubber. The two halves of the split ring 24 have their ends 27 connected by the bolts 28 which clamp the ring tightly about the contracted neck portion 13 of the tank extension at a distance below the flange 14. Gaskets 29 are provided between the ends 27 of the split ring halves, and an annular gasket 30 set in the inner face of the split ring 24, makes a tight joint between the inner face of the ring 24 and the outer face of the neck 13. From the foregoing description of the cover member 21 and its associated parts, it will be seen that a closure is provided for the manhole which effectively retains the steam used for vulcanization of the rubber in the tank, and permits access by the steam to those parts of the rubber covering which encompass the flange 14 and line the bolt-holes therein. Thus, the steam injected into the tank to vulcanize the tank lining 15, also reaches the rubber-covered flange 14 and vulcanizes the covering extending thereover. As the upper face of the split ring 24 is located well below the under face of the flange 14, that portion of the flange is easily accessible to the steam so satisfactory vulcanization of that part of the rubber covering is effected.

To prevent the steam pressure from raising the cover 21, the cover and the split ring 24 to which it is attached, are clamped down by means of bolts 31 which extend through the flange 23 on the cover, and through the split ring 24 as shown in Fig. 1. These bolts 31 connect with blocks 32 secured to and projecting radially from the outer face of the two-part clamping-ring 33. Each of the blocks 32 is slotted at 34 to adjustably receive one of the bolts 31. The two halves of the clamping-ring 33 are connected together by bolts 35 which pass through the laterally extended ends 36 formed on the ring-halves, as shown in Fig. 2. The clamping-ring 33 is clamped around the cylindrical tank-extension 9 below the row of rivets 12, these rivets preventing any upward shifting of the clamping-ring, which as a result acts to securely hold the tank-cover 21 and the split-ring 24 in position.

Assuming that the uncured rubber tank lining is in place, a portion of which has been provided over the flange 14, including the peripheral edge thereof and the under side of the same, and that the bolt-holes extending through the flange have been rubber lined about the temporary bolts 19 extending through them. Steam is then injected into the tank through an inlet pipe 37 which is threaded into the cover-member 21. The steam entering the tank vulcanizes the rubber lining 15 and also vulcanizes that part of the rubber which encompasses the flange 14 and lines the bolt-holes formed therein.

Each of the two halves of the split-ring 24 is provided with a pet-cock 41 and these pet-cocks are kept open during vulcanization to permit drainage of the steam condensate from the upper surface of the ring. This permits the steam free action against the under side of the flange 14 and a full vulcanization of the part 18 of the rubber is attained. The steam condensate collecting in the bottom of the tank is forced out of the tank by air pressure introduced through the pipe 37 which forces the condensate out through a rubber-covered discharge pipe 38 that extends through the cover 21 and has its lower end projecting into a bowl 39 formed in the bottom of the tank and within which a rubber spider 40 surrounding the end of the pipe 38 is provided.

When the vulcanization is complete, the vulcanizing unit, consisting of the cover 21, split ring 24 and the clamping-ring 33, is removed. The temporary bolts 19 are removed from the bolt-holes in the flange 14 and the manhole may then be covered by the conventional rubber-covered manhole cover which is bolted to the flange 14.

Although the present invention has been developed in connection with vulcanizing the rubber-covered flanges on the manholes of tank cars, it will be understood that the invention is not to be restricted to this use, since it is equally adapted for use in vulcanizing the flanges or flange-like parts of tanks in general and similar structures where it is inconvenient or impossible to place the tank or other structure in a vulcanizing chamber.

What I claim is:—

1. A device for aiding in the vulcanization of a rubber coating on a flange of a tank manhole, comprising means for covering the manhole and enclosing the flange thereon, and means engageable with a part of the tank for holding the covering means spaced from the flange whereby steam injected into the manhole will have free access to all portions of the rubber-covered flange.

2. A device for aiding in the vulcanization of a rubber-covered flange located on the cylindrical extension of a tank-car manhole, consisting of an enclosing unit fitting over the cylindrical extension and closing the open end thereof, means on said unit for providing a tight joint between the unit and the outer face of the cylindrical extension, and means for holding the portions of said unit located adjacent to the rubber-covered flange spaced from the same to permit free access of steam to all portions of said rubber-covered flange for vulcanization purposes.

3. A device for aiding in the vulcanization of a rubber-covered flange provided at the end of a cylindrical extension of a tank-car manhole, said device comprising a dome-shaped enclosure fitting over and confining the rubber-covered flange within it and engaged with the cylindrical extension, the inner face of the enclosure being spaced away from the flange whereby steam injected into the manhole will have free access to all portions of the rubber-covered flange.

4. A device for aiding in the vulcanization of a rubber-covered flange provided at the end of a cylindrical extension of a tank-car manhole, said device having an annular part clamped about the manhole extension at a distance below the under face of the rubber-covered flange, and a dome-shaped cover member closing the manhole extension and secured to said annular part, the cover member having an annular wall extending about the peripheral edge of the rubber-covered flange and spaced therefrom.

5. A device for aiding in the vulcanization of a rubber-covered flange on a tank-car manhole extension, comprising a clamp fitted about the manhole extension, a split ring extending about the manhole extension at a short distance below the rubber-covered flange thereon and connected to the clamp, and a dome-shaped cover member secured to the split ring and closing the manhole, said split ring and dome-shaped cover being held spaced from the rubber-covered flange and cooperating to form a steam-retaining enclosure for said flange to vulcanize the rubber covering thereon.

6. A device for aiding in the vulcanization of a rubber coating on the top, edge and under side of a flange on a tank-car manhole, comprising a cover means for enclosing the upper end of the manhole and the flange thereon, and means for securing the cover means to a part of the tank car with the cover means spaced away from all parts of the flange to permit the access of steam thereto.

7. A device for aiding in the vulcanization of a rubber coating on the top, edge and under side of a flange on a tank-car manhole, comprising a cover means for enclosing the upper end of the manhole and the flange thereon, the cover means being spaced away from all parts of the flange to permit access of steam thereto, and means connecting the cover means to a part of the tank car for holding down the cover to prevent its elevation by steam pressure.

8. A device for aiding in the vulcanization of a rubber coating on the top, edge, under face and in the boltholes of the flange of a manhole on a tank car, comprising a cover means enclosing the flange and having its inner face spaced away from the same, said cover means being provided with means located below the lower face of the flange for draining steam condensate out of the cover.

9. A device for aiding in the vulcanization of a rubber coating on a flange of a tank car manhole comprising means for covering the manhole and inclosing the flange thereon, and means engageable with a part of the tank car for holding the covering means spaced from the flange and forming a steam tight zone with the flange therein whereby steam injected into the manhole will have free access to all portions of the rubber-covered flange.

10. A device for aiding in the vulcanization of a rubber coating on all surfaces of a flange of a tank car manhole, comprising a cover member secured to a part of the tank car in spaced and inclosing relation with the flange and means forming a closed steam zone in the tank car with the flange in said zone.

11. A device for aiding in the vulcanization of a rubber coating on all surfaces of a flange on a tank car manhole extension comprising cover means having a steam tight clamping engagement with the manhole extension in spaced relation to the flange whereby steam injected into the manhole will have free access to all portions of the rubber coated flange.

JAMES I. MEADE.